United States Patent [19]
Kulperger

[11] Patent Number: 5,503,766
[45] Date of Patent: Apr. 2, 1996

[54] ENZYMATIC SOLUTIONS CONTAINING SAPONINS AND STABILIZERS

[75] Inventor: Robert J. Kulperger, New York, N.Y.

[73] Assignee: Natural Chemistry, Inc., New Canaan, Conn.

[21] Appl. No.: 43,398

[22] Filed: Apr. 6, 1993

[51] Int. Cl.$^6$ .............................. C11D 3/386; C11D 3/26; C11D 1/50

[52] U.S. Cl. .............................. 252/174.12; 252/DIG. 12; 435/188; 210/606; 210/636

[58] Field of Search ..................... 252/174.12, DIG. 12; 210/606, 636; 435/188

[56] References Cited

U.S. PATENT DOCUMENTS

| | | | |
|---|---|---|---|
| 3,635,797 | 1/1972 | Battistoni et al. | 195/56 |
| 4,684,469 | 8/1987 | Pedersen et al. | 210/632 |
| 4,882,059 | 11/1989 | Wong et al. | 210/606 |
| 5,108,746 | 4/1992 | Rho | 424/94 |

FOREIGN PATENT DOCUMENTS

| | | |
|---|---|---|
| 0342924 | 11/1989 | European Pat. Off. . |
| 60-106595 | 6/1985 | Japan . |
| 3867799 | 4/1991 | Japan . |
| 2140452 | 11/1984 | United Kingdom . |
| 8100566 | 3/1981 | WIPO . |

*Primary Examiner*—Paul Lieberman
*Assistant Examiner*—Kery Fries
*Attorney, Agent, or Firm*—George A. Skoler

[57] ABSTRACT

An enzyme-based aqueous cleaning and/or water clarifying solutions that provide improved cleansing and water clarifying capabilities and are exceptionally stabile to bacterial contamination. The invention also relates to the treatment of aqueous bodies and solid surfaces with the enzyme-based compositions of the invention in order to control the presence of contaminants. The objectives of the invention are achieved by including a small amount of a saponin in an aqueous enzyme-based composition containing a bacterial inhibiting stabilizer.

21 Claims, No Drawings

ENZYMATIC SOLUTIONS CONTAINING SAPONINS AND STABILIZERS

BRIEF DESCRIPTION OF THE INVENTION

An environmentally safe cleaning and/or water-clarifying aqueous solutions containing enzymes, stabilizers and a saponin.

BACKGROUND TO THE INVENTION

Stabilized aqueous enzyme solutions are commercially sold containing stabilizers against bacterial contamination, such as anionic and nonionic surfactants, benzoic acid, alkali metal benzoates with a small amount of an alkylolated urea possessing a heterocyclic ureido substituent, such as

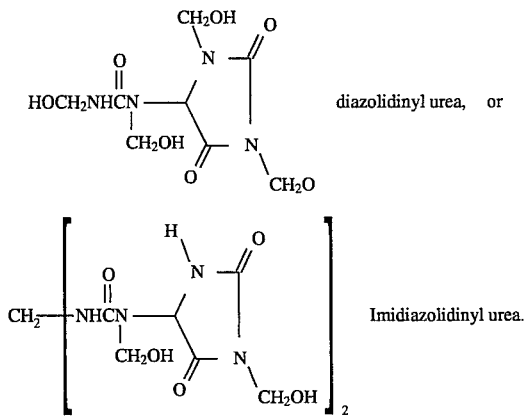

See EP Publication No. 0 342 924. The family of enzymes are suitable for this purpose, e.g., lyase, isomerase, ligase, oxidoreductase, transferase and hydrolase. Many of these solutions rely on enzymatic compositions that contain anionic and nonionic surfactants to enhance the activity of the aqueous enzyme composition. U.S. Pat. No. 3,635,797 illustrates suitable enzyme compositions made by the fermentation of a mixture of molasses, raw cane sugar, malt yeast and a magnesium salt catalyst. Such a fermentation product may be mixed with anionic or nonionic surfactants. The enzyme solutions deodorize and clean glass, metal, fibers, proteinaceous surfaces, water bodies, and the like. They are particularly effective as pool and spa water clarifiers. Though such enzyme solutions are effective in their cleaning and clarifying action, they are typically not as effective as synthetic cleansing and clarifying systems that do not rely on enzymes.

Saponin is defined[1] as any of numerous glycosides that occur in many plants (as soapbark, soapwort, or sarsaparilla), that are characterized by their properties of foaming in water solution and producing hemolysis when solutions are injected into the bloodstream, and that on hydrolysis yield a triterpenoid or steroid sapogenin and one or more sugars (as glycose, galactose, or xylose). They are also defined[2] as a yellowish to white acrid hygroscopic amorphous substance that in powder form causes sneezing, that is extracted especially from soapbark or soapwort, that contains a triterpenoid saponin as the active ingredient, and that is used chiefly as a foaming emulsifying agent and detergent.

[1]Webster's Third New International Dictionary, Unabridged, Merriam-Webster, Inc., Springfield, Mass., 1986.
[2]See footnote 1.

Saponins function in nature as surfactants that assist the flow of sap and nutrients in the life support system of the plant. Common sources of saponins are Yucca Extract from *Yucca Schidigera* and Quillaia Extract from *Quillaia Saponaria Molina*, also known as Saponin, Sarsaponin, Soap Bark, Panama Bark, China Bark and Quillaia Saponin. Quillaia Extract is water soluble material that imparts foaming attributes, lubricity and cleaning action at low concentrations. In soaps, shampoos and bubble baths, it aids in stabilizing the thin lacey foams of synthetic surfactants. Saponins in soft drink formulations provide foaming properties to the drink. The combination foam is denser, giving the appearance of being thicker, richer and creamier, and is longer lasting. It is nonionic and will not react with most chemicals or cosmetic ingredients.

There is a need for enzyme-based cleaning and water clarifying compositions that are (i) environmentally safe in that their components are natural products or biodegradable, and (ii) overall effective in cleaning and water clarifying as non-enzyme based materials currently available and which are not environmentally safe. Conventional enzyme-based cleaners to the extent that they are environmentally safe, are not as effective as the non-enzyme based compositions.

THE INVENTION

This invention relates to enzyme-based aqueous cleaning and/or water clarifying solutions that provide improved cleansing and water clarifying capabilities and are exceptionally stabile to bacterial contamination. The invention also relates to the treatment of aqueous bodies and solid surfaces with the enzyme-based compositions of the invention in order to control and remove contaminants associated therewith. The objectives of the invention are achieved by including a small amount of a saponin in an aqueous enzyme-based composition containing a bacterial inhibiting stabilizer. The resulting product is a more effective water clarifier and solid surface cleanser.

Though saponins are known surfactants, there are certain unexpected attributes of the compositions of the invention containing saponin and the processes of the invention relating to the use of the compositions. As noted above, saponins are known foamers, especially so in aqueous systems, and such property is incorporated in the dictionary definition of them. They are well recognized to enhance the foaming qualities of foamable aqueous systems. Additionally, enzyme-based aqueous solutions are known to have a tendency to froth. The incorporation of a saponin to an enzyme-based aqueous solution would be expected to enhance the foaming qualities of the solution. It has been unexpectedly found that saponin acts as a defoamer for enzyme-based aqueous solutions. Though foaming is generally felt to enhance cleansing power, in the case of this invention, saponins reduce foaming yet also enhance the cleaning and water clarification power of the solution.

In application of the compositions of the invention, the cleaning composition may be used as is or further diluted with water and then applied to the surface to be cleaned, and the pool and spa material may be further diluted or used as such, and added to the body of water making up the pool or spa. The amount of the composition that is used is dependent upon the cleansing or water clarifying action sought. The cleaning and water clarifying action generally takes place without physical agitation but physical agitation provides better working of the composition in terms of cleaning and water clarification. The compositions of the invention may be used to clean metals and metal plated surfaces, such as stainless steel and chrome plating, plastics, plastic composites, ceramics, painted surfaces, wood, glass, textiles, carpeting, animal hair and skin, and the like, to remove a wide variety of food, animal and cosmetic induced stains, dirt and grime, oil, grease, and the like. The composition of the invention provides superior deodorizing capabilities of such soiled surfaces.

DETAILED DESCRIPTION OF THE INVENTION

This invention is concerned with enzyme-based aqueous cleaning solutions and spa and pool water clarifiers. The compositions of the invention are unique because of the presence of saponin, a natural product that is known for its detergent and foaming properties, as a small component of the total composition. By adding saponins to the enzyme-based composition, there is obtained a solution that is more effective in its cleaning action (viz., in the treatment of solid surfaces) and in the clarification of water, accomplished in both instances, without contributing foaming qualities to the composition. In fact, saponins in the composition of the invention serve to reduce the foaming tendencies of the composition of the invention.

The composition of the invention has been successful in water clarification of large water bodies such as Disney World's Typhoon Lagoon, Orlando, Fla., without the foaming qualities of typical prior art saponin containing compositions and typical prior art enzyme-based water clarifiers. In spa applications, the compositions of the invention clarify more quickly than conventional enzyme-based compositions and more quickly clear the spa's filters. It has been found that the saponin acts as a flocculating agent, creating a flocculant that is effectively broken down by the enzyme component of the composition of the invention.

The enzymes suitable in the practice of the invention include the family of enzymes, e.g., lyase, isomerase, ligase, oxidoreductase, transferase and hydrolase. A desirable enzyme mixture includes lipase, α-amylase and protease activities. A suitable enzyme mixture is obtained by the fementation of a mixture of molasses, raw cane sugar, malt, and yeast as described in U.S. Pat. No. 3,635,797. The enzyme mixture may contain nonionic surfactant. The nonionic surfactants contain molecular portions which are lipophilic (hydrophobic) and other molecular portions which are lipophobic (hydrophylic). These portions become the basis of determining their surface active properties by their hydrophilic-lipophilic balance (HLB). See Griffin, W. C., Emulsifier Evaluation By Water Absorption, *Proc. of Scientific Section of Toilet Good Association*, Vol. 6, pages 43–50 (Dec. 5, 1946 (cf. C.A. 41, p. 1133H). Desirable nonionics are the organic aliphatic ether compounds. They contain at least one ether group, generally at least three ether groups in the portion of the molecule which provides the lipophobic (hydrophylic) character to the surface active agent. The ether groups are desirably derived by the alkoxylation of an active hydrogen compound which provides the lipophilic (hydrophobic) character or property to the surface active agent. Preferred alkoxylated compounds are those derived from ethylene oxide. Superior alkoxylated compounds are those derived from the alkoxylation of hydroxyl containing compounds (aliphatic and aromatic) with ethylene oxide. It is most preferred that the lipophilic (hydrophobic) portion of the the nonionic surfactant molecule contain an aliphatic moiety containing at least 6 —$CH_2$— in sequence to form at least a hexylene bridge in the structure. The preferred active hydrogen compounds for forming these nonionic surfactants are the fatty alcohols containing at least about 8 carbon atoms and generally not greater than about 24 carbon atoms or the fatty acid esters that are alkoxylatable to the nonionic surfactant structure. The fatty alcohols are the hydrogenated versions of the fatty acid, though they may be synthesized by other synthetic routes, such as by the carbonylation of alkenes followed by hydrogenation of the oxo compound or the hydration of such alkenes. Other nonionic surfactants that may be used differ in the nature of the lipophilic portion of the molecule. The choice of such portion is not narrowly critical. Thus, the lipophilic portion may be aralkyl, alkaryl, alkyl, alkylesters, and the like.

As noted above, common sources of saponin is Yucca Extract from *Yucca Schidigera* and Quillaia Extract from *Quillaia Saponaria Molina*. Either extract is suitable in the practices of the invention. In the examples that follow, the Yucca Extract cited in from *Yucca Schidigera*. Comparable results are obtainable using Quillaia Extract. In this specification and claims, the terms saponin and Yucca Extract are synonymous.

The composition of the invention comprises an enzyme-based aqueous composition containing a minor amount of saponin. In particular, the invention relates to a composition containing a major amount of water and a minor amount of an active ingredient combination of an enzyme, saponin and a bacterial inhibiting stabilizer. In a preferred embodiment, the active ingredient combination comprises less than 50 percent by weight of the composition, and of that combination, a major amount is enzyme and a minor amount comprises the saponin and the bacterial inhibiting stabilizer. In a more preferred embodiment, the active ingredient combination comprises from about 0.05 to about 10 weight percent of the composition of the invention, preferably from about 1 to about 10 weight percent of the composition of the invention, the remainder being water. Of the active ingredient combination, about 99 to about 70 weight percent is enzyme, about 0.05 to about 30 weight percent is the saponin and about 0.01 to about 10 weight percent is the bacterial inhibiting stabilizer.

The bacterial inhibiting stabilizer for the cleaning and clarifying compositions of the invention can vary, depending upon the specific application for which the composition is designed. A matter to be considered is the pH of the enzyme solution that is modified by this invention. Generally, the enzyme solution is mildly acidic, typically having a pH ranging from about 3.5 to about 4.5. However, the solution can be alkaline, even to a pH of 10–11, by an acid pH is preferred. In addition, cleaning compositions require greater stabilization against bacterial contamination. There are a variety of chemicals that are known bacterial stabilizers for aqueous enzyme-based solutions. A suitable combination of chemicals for use as a stabilizer is a combination of one or more aromatic carboxylic acids or their alkali metal salts, an alkylolated urea possessing a heterocyclic ureido substituent and/or a water solubilized alkanol. In pool and spa directed applications, the compositions of the invention may include as the stabilizer an alkali metal salt of an aromatic carboxylic acid and an alkylolated urea possessing a heterocyclic ureido substituent. It is desirable that all such compositions be acidic, preferably with a pH of less than about 5, most preferably, less than about 4.5 and typically not lower than about 3.5. When the pH of the composition of the invention is greater than about 5 or 6, it is desirable to include the presence of an alkanol in the composition in order to preclude deleterious bacterial growth. A particularly good combination of reagents for effecting desirable bacterial stabilization is an aromatic acid such as benzoic acid, an alkylolated urea such as imidiazolidinyl urea, and an alkanol such as ethanol.

Organic acid addition to the composition of the invention can be used to reduce the pH of the composition to a desired level for effective stabilization. A variety of organic acids are useable. Preferably, the organic acid is a natural product such as acetic acid, citric acid, and the like. The selection of the organic acid is not narrowly critical, but in the preferred practice of the invention, the organic acid is readily biodegrable.

The art contains many disclosures of stabilizer systems for aqueous enzyme formulations. Many describe the use of alcohols and ether alcohols for stabilizing such compositions. It has been determined that an effective stabilizer composition includes an aromatic carboxylic acid or its sodium or potassium salt, one or more of diazolidinyl urea and imidiazolidinyl urea, described above, and optionally, a lower ($C_{1-4}$) alkanol, such as ethanol. It is preferred that the composition of the invention have a pH of between about 3.5 to about 5, though a pH as high a 8–11 is suitable provided that the stabilizer component of the composition is sufficient to assure solution stability.

Suitable illustrative aromatic carboxylic acid that may be used as such or as the sodium or potassion salt form are the following:

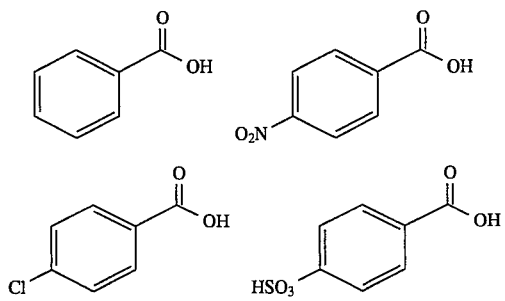

-continued

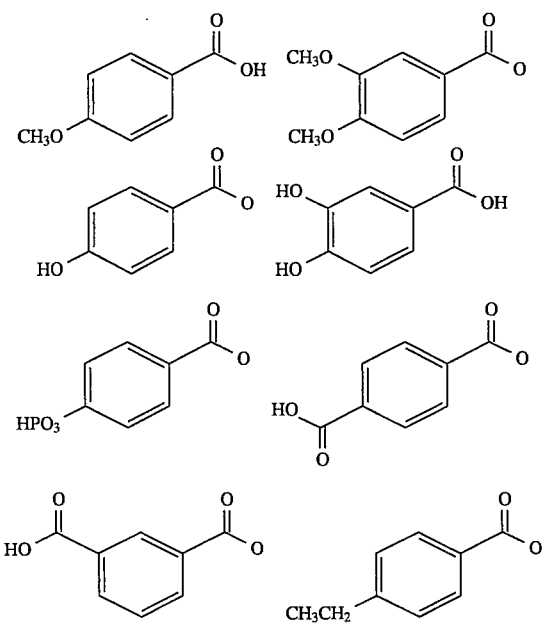

and the like structures.

Illustrative of formulations of the compositions of the invention are the following:

| Example No. | Type of Product | Ingredient | Formulation Procedure |
|---|---|---|---|
| 1. | Spa formulation | Poolzyme, an aqueous mixture of enzymes and surfactant, containing ~5-5.5 weight % solids, sold by International Enzymes, Inc., Las Vegas, Nevada. Yucca Extract, sold by Bell Flavors & Fragrances, Northbrook, IL. Sodium benzoate Imidiazolidinyl urea water | 2.05 gallons of Poolzyme and 0.15 gallon of the Yucca Extract are added to 100 gallons of water. The sodium benzoate (.8 lb/94 gallons of water) and imidiazolidinyl urea (.8 lb/94 gallons of water) are dissolved first in a small amount of water and then combined with the Poolzyme - Yucca Extract aqueous solution. If the pH is greater than 4.0, then added sufficient citric acid to drop the pH to below 4. |
| 2. | Pool formulation for use with Baquacil ®, a nonchlorine water additive sold by ICI America, Inc. | Same as Example 1 | One part of Poolzyme is added per 15 parts of water. Specifically, 5.3 parts by volume of Poolzyme and 1 part by volume of Yucca Extract are mixed with 93.75 parts by volume of water. The remainder of the formulation is the same as described in Example 1. |
| 3. | Pool formula | Same as Example 1 except for the addition of denatured ethanol. | Poolzyme (6.2 gallons) is combined with Yucca Extract (1.2 gallons) and dissolved in 55 gallons of water. The following stabilizer mixture is prepared in a small amount of water: 0.44 lb sodium benzoate, 0.44 lbs imidiazoildinyl urea and 0.55 gallons of ethanol (Neosal ®), per 55 gallons, and then the mixture is added to the rest of the formulation. If the pH is greater than 4.0, then added sufficient citric acid to drop the pH to |

| Example No. | Type of Product | Ingredient | Formulation Procedure |
|---|---|---|---|
| 4. | Glass Cleanser formulation | Greenzyme, an aqueous mixture of enzymes and nonionic surfactant, containing ~4 weight % solids, sold by International Enzymes, Inc., Las Vegas, Nevada. Yucca Extract, sold by Bell Flavors & Fragrances, Northbrook, IL Benzoic acid imidiazoildinyl urea ethanol deionized water FDIC Blue Dye #1 | below 4. Thoroughly mixed Greenzyme (0.2 gallons per 100 gallons of water) is mixed with Yucca Extract (0.1 gallon per 100 gallons). The stabilizer component [benzoic acid (0.8 lb.), imidiazoildinyl urea (0.8 lb.), and ethanol (0.1 gallon)] is fully dissolved. The benzoic acid is mixed in the full batch. If the pH is greater than 4.0, then add sufficient citric acid to drop the pH to below 4. The dye (0.075 gallon) is added as a 1% aqueous solution. |
| 5. | All purpose cleaner | Same as example 4 except that no dye is added. | Same as example 4 except that the formulation contains 0.5% v/v Greenzyme and 0.1% v/v of Yucca Extract. The stabilizer component contains 0.1 wt % of benzoic acid, 0.1 wt. % imidiazolidinyl urea, and 0.1 v/v % of the ethanol. If the pH is greater than 4.0, then add sufficient citric acid to drop the pH to below 4. |

I claim:

1. A cleaner or water clarifier composition processing reduced foaming properties comprising an aqueous solution that contains a major amount of water and a minor amount of an active ingredient combination containing about 70 to about 99 weight percent of an enzyme composition, about 0.05 to about 30 weight percent of a saponin and about 0.01 to about 10 weight percent of a bacterial inhibiting stabilizer.

2. The composition of claim 1 wherein the active ingredient combination further includes a bacterial inhibiting stabilizer composition.

3. The composition of claim 2 wherein it is a cleaning composition.

4. The composition of claim 2 wherein it is a water clarifier composition.

5. The composition of claim 2 wherein the saponin is one of Yucca Extract and Quillaia Extract.

6. The composition of claim 2 wherein the composition has a pH less than about 5.

7. The composition of claim 6 wherein the composition has a pH less than about 4.5.

8. The composition of claim 7 wherein the pH is between 3.5 and 4.5.

9. The composition of claim 5 wherein the composition has a pH less than about 5.

10. The composition of claim 9 wherein the saponin is Yucca Extract.

11. The composition of claim 6 wherein the bacterial inhibiting stabilizer is a mixture of aromatic carboxylic acid or sodium or potassium salt thereof, an alkylolated urea possessing at least one of a heterocyclic ureido substituent and a water solubilized alkanol.

12. The composition of claim 11 wherein the composition is a water clarifier.

13. The composition of claim 11 wherein the composition is a cleanser.

14. The composition of claim 12 wherein the stabilizer is a mixture of alkali metal salt of an aromatic carboxylic acid and an alkylolated urea possessing a heterocyclic ureido substituent.

15. The composition of claim 13 wherein the stabilizer is a mixture of an aromatic carboxylic acid, an alkylolated urea possessing a heterocyclic ureido substituent and an alkanol.

16. The composition of claim 15 wherein the alkanol is ethanol.

17. The composition of claim 16 wherein the active ingredient combination comprises less than 50 percent by weight of the composition, and of that combination, a major amount is enzyme and a minor amount comprises the saponin and the bacterial inhibiting stabilizer.

18. The composition of claim 1 wherein the active ingredient combination comprises from about 0.05 to about 10 weight percent of the composition of the invention.

19. The composition of claim 18 wherein the active ingredient combination comprises from about 1 to about 10 weight percent of the composition of the invention, the remainder being water.

20. The process of clarifying a water body which comprises adding a small amount of the composition of claim 1 to the water body.

21. The process of cleaning a surface containing contaminents which comprises applying the composition of claim 1 to the surface and removing contaminants on the surface.

* * * * *